US012780034B2

(12) United States Patent
Terasawa et al.

(10) Patent No.: US 12,780,034 B2
(45) Date of Patent: Nov. 3, 2026

(54) MANAGEMENT APPARATUS AND MANAGEMENT SYSTEM

(71) Applicant: TOYOTA JIDOSHA KABUSHIKI KAISHA, Toyota (JP)

(72) Inventors: Yuko Terasawa, Tokyo-to (JP); Makoto Kakuchi, Toyota (JP); Toshiaki Karasawa, Tokyo-to (JP); Takeshi Higashi, Nagoya (JP); Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 590 days.

(21) Appl. No.: 18/480,561

(22) Filed: Oct. 4, 2023

(65) Prior Publication Data

US 2024/0116394 A1 Apr. 11, 2024

(30) Foreign Application Priority Data

Oct. 5, 2022 (JP) ................................ 2022-161051

(51) Int. Cl.

*H02J 7/00* (2026.01)
*B60L 53/66* (2019.01)
*B60L 53/80* (2019.01)
*G06Q 30/0283* (2023.01)
*G06Q 50/06* (2012.01)

(52) U.S. Cl.

CPC ............. *B60L 53/80* (2019.02); *B60L 53/665* (2019.02); *G06Q 30/0283* (2013.01); *G06Q 50/06* (2013.01); *B60L 2250/00* (2013.01)

(58) Field of Classification Search

USPC .......................................................... 320/109
See application file for complete search history.

(56) References Cited

U.S. PATENT DOCUMENTS

2017/0151885 A1* 6/2017 Kim ........................ B60L 58/12
2019/0118665 A1 4/2019 Mizutani et al.
2021/0018331 A1 1/2021 Tsuchiya
2021/0048302 A1* 2/2021 Maeda .................... B60L 58/12
(Continued)

FOREIGN PATENT DOCUMENTS

CN 102377220 A 3/2012
CN 110015120 A 7/2019
CN 111898782 A 11/2020
(Continued)

*Primary Examiner* — Samuel Berhanu
(74) *Attorney, Agent, or Firm* — Sughrue Mion, PLLC

(57) ABSTRACT

A server (management apparatus) includes: a communication unit (first acquisition unit) that acquires a request regarding adjustment of electric power supply-and-demand in a power grid; and a processor (controller) that performs, based on the request, control to notify, a user of an electrically powered vehicle, of a replacement cost required for battery replacement at a battery station (battery replacement apparatus). When charging with electric power of the power grid is requested and a battery (first battery) of the electrically powered vehicle has an SOC lower than the SOC of a battery (second battery) having a maximum SOC to be used for charging, among a plurality of batteries (second batteries), the processor performs control to notify the user of the replacement cost lower than a normal replacement cost.

9 Claims, 5 Drawing Sheets

(56) References Cited

U.S. PATENT DOCUMENTS

| | | | | |
|---|---|---|---|---|
| 2021/0331601 | A1* | 10/2021 | Yang | B60L 58/10 |
| 2023/0278463 | A1* | 9/2023 | Poloni | G07C 5/004 701/31.9 |

FOREIGN PATENT DOCUMENTS

| | | | |
|---|---|---|---|
| CN | 112238783 | A | 1/2021 |
| JP | 2002-291110 | A | 10/2002 |

* cited by examiner

MANAGEMENT APPARATUS AND MANAGEMENT SYSTEM

CROSS REFERENCE TO RELATED APPLICATIONS

This nonprovisional application is based on Japanese Patent Application No. 2022-161051 filed on Oct. 5, 2022 with the Japan Patent Office, the entire contents of which are hereby incorporated by reference.

BACKGROUND

Field

The present disclosure relates to a management apparatus and a management system.

Description of the Background Art

Japanese Patent Laying-Open No. 2002-291110 discloses a method for charging a battery rental cost. According to this method, a rental cost is calculated based on data on usage for charging or discharging by a borrower of a battery.

SUMMARY

Although not explicitly disclosed in above-referenced Japanese Patent Laying-Open No. 2002-291110, a battery of a battery station may be used to meet a request for power supply-and-demand adjustment in a power grid. Hence, there is a demand for a system capable of easily meeting a request for power supply-and-demand adjustment in a power grid by using batteries of a battery station (battery replacement apparatus).

The present disclosure is given for solving the above problem, and an object of the present disclosure is to provide a management apparatus and a management system capable of easily meeting a request for power supply-and-demand adjustment in a power grid by using batteries of a battery replacement apparatus.

A management apparatus according to a first aspect of the present disclosure is a management apparatus that manages a battery replacement apparatus provided with at least one battery replaceable with a battery mounted on an electrically powered vehicle, the battery mounted on the electrically powered vehicle being a first battery, the at least one battery provided in the battery replacement apparatus being at least one second battery, the management apparatus includes: a first acquisition unit that acquires a request regarding adjustment of electric power supply-and-demand in a power grid; and a controller that performs, based on the request, control to notify, a user of the electrically powered vehicle, of a replacement cost required for battery replacement at the battery replacement apparatus. The at least one second battery includes a maximum SOC battery having an SOC that is maximum among the at least one second battery that can meet a request for charging with electric power of the power grid. When the charging is requested and the first battery has an SOC lower than a predetermined charging threshold value that is based on the SOC of the maximum SOC battery, the controller performs control to notify the user of the replacement cost lower than a normal replacement cost.

In the management apparatus according to the first aspect of the present disclosure, when charging with electric power of the power grid is requested and the first battery has an SOC lower than the predetermined charging threshold value that is based on the SOC of the maximum SOC battery, control is performed to notify the user of the replacement cost lower than a normal replacement cost. Thus, the replacement cost is lowered that is to be paid by the user of the electrically powered vehicle on which the first battery is mounted having an SOC lower than the predetermined charging threshold value based on the maximum SOC, so that the possibility (frequency) at which the user uses the battery replacement apparatus can be increased. As a result, it is possible to easily increase the amount of charging the battery of the battery replacement apparatus with the power of the power grid. Accordingly, it is possible to easily meet the request for adjustment of electric power supply-and-demand in the power grid. It is therefore possible to easily meet the request for adjustment of electric power supply-and-demand in the power grid, by means of the battery of the battery replacement apparatus.

The management apparatus according to the first aspect preferably includes a second acquisition unit that acquires information about a distance between the electrically powered vehicle and the battery replacement apparatus. When the charging is requested and the first battery has an SOC lower than the predetermined charging threshold value, the controller performs control to lower the replacement cost of which the user is notified, as a position of the electrically powered vehicle is farther from the battery replacement apparatus. With such a configuration, it is possible to increase the possibility (frequency) at which the user of the electrically powered vehicle located further from the battery replacement apparatus uses the battery replacement apparatus. As a result, the electrically powered vehicle travels over a relatively longer distance, so that the first battery having a relatively lower SOC is stored in the battery replacement apparatus. As a result, it is possible to more easily meet the request for adjustment of power supply-and-demand in the power grid, by means of the battery of the battery replacement apparatus.

In the management apparatus according to the first aspect, when the charging is requested and the first battery has an SOC lower than the predetermined charging threshold value, the controller preferably performs control to lower the replacement cost of which the user is notified, as the SOC of the first battery is lower. With such a configuration, the first battery having a relatively lower SOC can easily be stored in the battery replacement apparatus.

A management apparatus according to a second aspect of the present disclosure is a management apparatus that manages a battery replacement apparatus provided with at least one battery replaceable with a battery mounted on an electrically powered vehicle, the battery mounted on the electrically powered vehicle being a first battery, the at least one battery provided in the battery replacement apparatus being at least one second battery, the management apparatus includes: a first acquisition unit that acquires a request regarding adjustment of electric power supply-and-demand in a power grid; and a controller that performs, based on the request, control to notify, a user of the electrically powered vehicle, of a replacement cost required for battery replacement. The at least one second battery includes a minimum SOC battery having an SOC that is minimum among the at least one second battery that can meet a request for power feeding to the power grid. When the power feeding is requested and the first battery has an SOC lower than a predetermined power feeding threshold value that is based on the SOC of the minimum SOC battery, the controller performs control to notify the user of the replacement cost higher than a normal replacement cost.

In the management apparatus according to the second aspect of the present disclosure, when power feeding to the power grid is requested and the first battery has an SOC lower than the predetermined power feeding threshold value that is based on the SOC of the minimum SOC battery, control is performed to notify the user of the replacement cost higher than a normal replacement cost. Thus, the replacement cost is raised that is to be paid by the user of the electrically powered vehicle on which the first battery is mounted having an SOC lower than the predetermined power feeding threshold value based on the minimum SOC, so that the possibility (frequency) at which the user uses the battery replacement apparatus can be decreased. As a result, it is possible to suppress reduction of the amount of electric power that can be fed to the power grid from the battery of the battery replacement apparatus. It is therefore possible to easily meet the request for adjustment of electric power supply-and-demand in the power grid, by means of the battery of the battery replacement apparatus.

The management apparatus according to the second aspect preferably includes a second acquisition unit that acquires information about a distance between the electrically powered vehicle and the battery replacement apparatus. When the power feeding is requested and the first battery has an SOC lower than the predetermined power feeding threshold value, the controller performs control to raise the replacement cost of which the user is notified, as a position of the electrically powered vehicle is farther from the battery replacement apparatus. With such a configuration, it is possible to decrease the possibility (frequency) at which the user of the electrically powered vehicle located further from the battery replacement apparatus uses the battery replacement apparatus. As a result, it is possible to further suppress storage of the first battery having a relatively lower SOC in the battery replacement apparatus. As a result, it is possible to more easily meet the request for adjustment of power supply-and-demand in the power grid, by means of the battery of the battery replacement apparatus.

In the management apparatus according to the second aspect, when the power feeding is requested and the first battery has an SOC lower than the predetermined power feeding threshold value, the controller preferably performs control to raise the replacement cost of which the user is notified, as the SOC of the first battery is lower. With such a configuration, it is possible to more easily suppress storage of the first battery having a relatively lower SOC in the battery replacement apparatus.

A management system according to a third aspect of the present disclosure includes: an electrically powered vehicle on which a first battery is mounted; and a management apparatus that manages a battery replacement apparatus provided with at least one second battery replaceable with the first battery. The management apparatus includes: an acquisition unit that acquires a request for adjustment of electric power supply-and-demand in a power grid; and a controller that performs, based on the request for adjustment, control to notify, a user of the electrically powered vehicle, of a replacement cost required for battery replacement. The at least one second battery includes a maximum SOC battery having an SOC that is maximum among the at least one second battery that can meet a request for charging with electric power of the power grid. When the charging is requested and the first battery has an SOC lower than a predetermined charging threshold value that is based on the SOC of the maximum SOC battery, the controller performs control to notify the user of the replacement cost lower than a normal replacement cost.

In the management apparatus according to the third aspect, when charging with electric power of the power grid is requested and the first battery has an SOC lower than the predetermined charging threshold value that is based on the SOC of the maximum SOC battery, control is performed to notify the user of the replacement cost lower than a normal replacement cost. Thus, the management system can be provided that enables the request for adjustment of power supply-and-demand in the power grid to be met easily, by means of the battery of the battery replacement apparatus.

In the management system according to the third aspect, the electrically powered vehicle preferably includes at least one electrical device. When the charging is requested and the first battery has an SOC lower than the predetermined charging threshold value, the controller performs control to transmit, to the electrically powered vehicle, a command signal to increase a value of electric current flowing in the at least one electrical device. The electrically powered vehicle increases, based on the command signal, the value of electric current flowing in the at least one electrical device. With such a configuration, it is possible to further decrease the SOC of the first battery having an SOC lower than the predetermined charging threshold value, by the increase of the value of electric current.

A management system according a fourth aspect of the present disclosure includes: an electrically powered vehicle on which a first battery is mounted; and a management apparatus that manages a battery replacement apparatus provided with at least one second battery replaceable with the first battery. The management apparatus includes: an acquisition unit that acquires a request for adjustment of electric power supply-and-demand in a power grid; and a controller that performs, based on the request for adjustment, control to notify, a user the electrically powered vehicle, of a replacement cost required for battery replacement. The at least one second battery includes a minimum SOC battery having an SOC that is minimum among the at least one second battery that can meet a request for power feeding to the power grid. When the power feeding is requested and the first battery has an SOC lower than a predetermined power feeding threshold value that is based on the SOC of the minimum SOC battery, the controller performs control to notify the user of the replacement cost higher than a normal replacement cost.

In the management system according to the fourth aspect of the present disclosure, when power feeding to the power grid is requested and the first battery has an SOC lower than the predetermined power feeding threshold value that is based on the SOC of the minimum SOC battery, control is performed to notify a user of the electrically powered vehicle of the replacement cost higher than a normal replacement cost. Thus, the management system can be provided that enables the request for adjustment of power supply-and-demand in the power grid to be met easily, by means of the battery of the battery replacement apparatus.

In the management system according to the fourth aspect, the electrically powered vehicle preferably includes at least one electrical device. When the power feeding is requested and the first battery has an SOC higher than or equal to the predetermined power feeding threshold value, the controller performs control to transmit, to the electrically powered vehicle, a command signal to decrease a value of electric current flowing in the at least one electrical device. The electrically powered vehicle decreases, based on the command signal, the value of electric current flowing in the at least one electrical device. With such a configuration, it is possible to suppress decrease of the SOC of the first battery having an SOC higher than or equal to the predetermined power feeding threshold value, by the decrease of the value of electric current.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
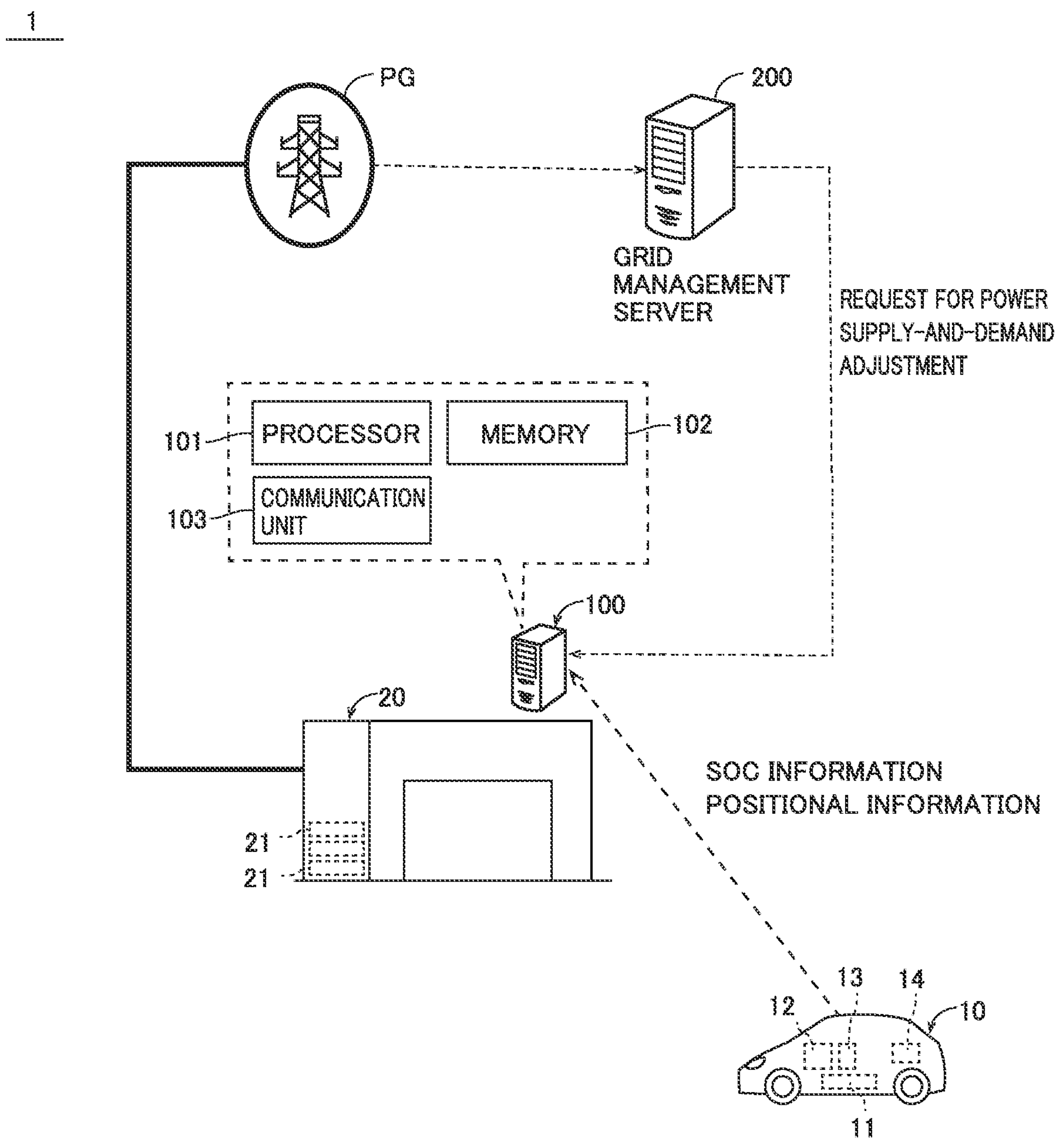
FIG. 1 shows a configuration of a management system according to one embodiment.

Embodiments of the present disclosure are described hereinafter with reference to the drawings. In the drawings, the same or corresponding parts are denoted by the same reference characters, and a description thereof is not herein repeated.

FIG. 1 shows a configuration of a management system 1 according to the present embodiment. Management system 1 includes a server 100, an electrically powered vehicle 10, a battery station 20, a grid management server 200, and a power grid PG. Server 100 manages battery station 20. Server 100 may be provided at battery station 20. Management system 1 may be provided with a plurality of electrically powered vehicles 10. Server 100 and battery station 20 are respective examples of "management apparatus" and "battery replacement apparatus" of the present disclosure, respectively.

Electrically powered vehicle 10 includes a traction battery 11, a traction motor 12, a cooling apparatus 13, and a communication device 14. Cooling apparatus 13 is an apparatus for cooling motor 12. Communication device 14 may include a DCM (Data Communication Module), or include a communication I/F compatible with the 5G (fifth generation mobile communication system). Cooling apparatus 13 is an example of "electrical device" of the present disclosure.

Electrically powered vehicle 10 includes, for example, PHEV (Plug-in Hybrid Electric Vehicle), BEV (Battery Electric Vehicle), and FCEV (Fuel Cell Electric Vehicle). Electrically powered vehicle 10 may include DCM (Data Communication Module) or include a communication I/F compatible with the 5G (fifth generation mobile communication system).

Battery station 20 is provided with a plurality of batteries 21. At battery station 20, battery 11 mounted on electrically powered vehicle 10 is replaced with a battery 21. Battery 11 and battery 21 are respective examples of "first battery" and "second battery" of the present disclosure, respectively.

Power grid PG is a power network made up of a power plant and a power transmission and distribution facility (not shown). In this embodiment, an electric power company serves as both a power generation entity and a power transmission and distribution entity. The electric power company corresponds to a general power transmission and distribution entity, and maintains and manages power grid PG. The electric power company corresponds to an administrator of power grid PG.

Grid management server 200 manages power supply-and-demand in power grid PG (power network). Grid management server 200 belongs to the electric power company. Grid management server 200 transmits, to server 100, a request for adjustment of the amount of power demand for power grid PG (power supply-and-demand adjustment request), based on power generation and power consumption by each power adjustment resource managed by grid management server 200. Specifically, when the power generation or power consumption of the power adjustment resource is assumed to be larger (or is currently larger) than the normal one, grid management server 200 transmits a request, to server 100, to make the amount of power demand larger or smaller than the normal one.

Server 100 is a server managed by an aggregator. The aggregator refers to an electricity entity that aggregates a plurality of power adjustment resources such as local and/or predetermined facilities and offers an energy management service.

Server 100 uses battery 21 in battery station 20 as one means for increasing or decreasing the amount of power demand for power grid PG to perform power feeding to power grid PG (external power feeding) and charging from power grid PG (external charging).

Server 100 is also configured to manage information about registered electrically powered vehicle 10 (hereinafter also referred to as "vehicle information"), and information about each registered user (hereinafter also referred to as "user information"). The user information and the vehicle information are each distinguished by identification information (ID) and stored in a memory 102 described later herein.

Vehicle ID is identification information for identifying electrically powered vehicle 10. The vehicle ID may be a number plate or VIN (Vehicle Identification Number). The vehicle information includes an action schedule of each electrically powered vehicle 10.

Server 100 includes a processor 101, memory 102, and a communication unit 103. Processor 101 controls communication unit 103. Memory 102 stores, in addition to a program to be executed by processor 101, information (for example, map, formula, and various parameters) to be used by the program. Processor 101 is an example of "controller" of the present disclosure. Communication unit 103 is an example of "first acquisition unit," "second acquisition unit" and "acquisition unit" of the present disclosure.

Communication unit 103 of server 100 communicates with each of grid management server 200 and electrically powered vehicle 10. Communication unit 103 includes various communication I/Fs.

Communication unit 103 of server 100 receives, from grid management server 200, information about a request for adjustment of power supply-and-demand in power grid PG. Communication unit 103 of server 100 communicates with electrically powered vehicle 10 to receive positional information about electrically powered vehicle 10 and information about the SOC (State Of Charge) of electrically powered vehicle 10.

Server 100 acquires information about the SOC of each of a plurality of batteries 21 provided in battery station 20, through communication unit 103. The information about the SOC of battery 21 is stored in memory 102.

Processor 101 also calculates the distance between electrically powered vehicle 10 and battery station 20, based on the positional information about electrically powered vehicle 10. Here, the distance between electrically powered vehicle 10 and battery station 20 means the distance of the shortest route for electrically powered vehicle 10 to reach battery station 20. The distance between electrically powered vehicle 10 and battery station 20 may be a linear distance between electrically powered vehicle 10 and battery station 20.

Processor 101 also performs control to notify, a user of electrically powered vehicle 10, of a replacement cost required for battery replacement at battery station 20, based on a request for adjustment of power supply-and-demand in power grid PG.

The conventional system does not take into consideration the fact that a battery of the battery station is used to meet the request for adjustment of power supply-and-demand in the power grid. Thus, there is a demand for a system capable of easily meeting the request for adjustment of power supply-and-demand in the power grid, using batteries of the battery station.

In the present embodiment, when charging with electric power of power grid PG is requested (i.e., in the case of DR (demand response) requiring external charging) and battery 11 has an SOC lower than the SOC of battery 21 that has the maximum SOC among a plurality of batteries 21 at battery station 20 and is to be used for charging, processor 101 performs control to notify the user of a replacement cost lower than a normal replacement cost. Processor 101 performs the above-described control based on, for example, the SOC of each of battery 21 and battery 11 at the time when an inquiry about the cost for battery replacement is received from the user of electrically powered vehicle 10. In the following, a DR requiring external charging is referred to as charging DR. The SOC of battery 21 having the maximum SOC as described above is an example of "predetermined charging threshold value" of the present disclosure.

For example, in battery station 20, a plurality of batteries 21 to meet the requirement, and a plurality of batteries 21 to be used for replacement with battery 11 may be determined (assigned) in advance. In this case, processor 101 performs the above-described control, when battery 11 has an SOC lower than the SOC of battery 21 having the maximum SOC among a plurality of batteries 21 to meet the requirement. In the following, battery 21 having the maximum SOC among a plurality of batteries 21 refers to battery 21 having the maximum SOC among a plurality of batteries 21 to meet the requirement.

In battery station 20, a plurality of batteries 21 to meet to the requirement, and a plurality of batteries 21 to be used for replacement with battery 11 may not be determined (assigned) in advance. Here, battery 21 in battery station 20 is charged to have an SOC of 100%, in preparation for battery replacement when battery replacement is scheduled. In this case, the maximum SOC may mean the maximum value among respective SOCs of a plurality of batteries 21 before being charged in preparation for battery replacement.

For the charging DR, when battery 11 has an SOC lower than the SOC of battery 21 having the maximum SOC among a plurality of batteries 21 of battery station 20, processor 101 performs control to lower the replacement cost of which the user is notified, as the position of electrically powered vehicle 10 is farther from battery station 20. Processor 101 performs the above-described control based on, for example, the position of electrically powered vehicle 10 at the time when an inquiry about the cost for battery replacement is received from the user of electrically powered vehicle 10.

For the charging DR, when battery 11 has an SOC lower than the SOC of battery 21 having the maximum SOC among a plurality of batteries 21 of battery station 20, processor 101 performs control to lower the replacement cost of which the user is notified, as the SOC of electrically powered vehicle 10 is lower. Processor 101 performs the above-described control based on, for example, the SOC of battery 11 at the time then an inquiry about the cost for battery replacement is received from the user of electrically powered vehicle 10.

Figure 2:
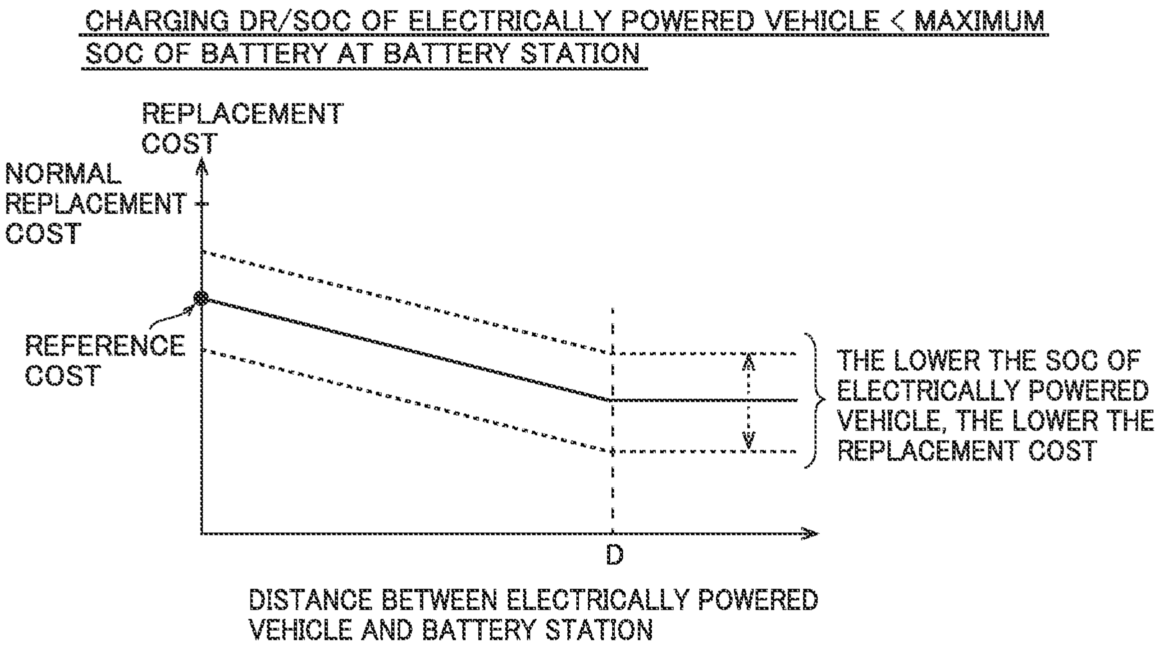
FIG. 2 shows a change of a battery replacement cost for a DR requiring external charging.

Specifically, as shown in FIG. 2, in the range where the distance between electrically powered vehicle 10 and battery station 20 is from 0 to D (for example, 10 km), the cost for battery replacement decreases in proportion to the increase of the distance. For the distance exceeding D, the replacement cost is kept constant. The replacement cost depending on the distance decreases as the SOC of electrically powered vehicle 10 decreases. The replacement cost decreases in proportion to the decrease of the SOC of electrically powered vehicle 10.

In the present embodiment, when power feeding to power grid PG is requested (i.e., in the case of DR requiring external power feeding) and battery 11 has an SOC lower than the SOC of battery 21 that has the minimum SOC among a plurality of batteries 21 at battery station 20 and is to be used the power feeding, processor 101 performs control to notify the user of a replacement cost higher than the normal replacement cost. Processor 101 performs the above-described control, based on, for example, the SOC at the time when an inquiry about the cost for battery replacement is received from the user of electrically powered vehicle 10. In the following, a DR requiring external power feeding is referred to as power feeding DR. The SOC of battery 21 having the minimum SOC is an example of "predetermined power feeding threshold value" of the present disclosure.

Similarly to the above case of the request for charging, when battery 11 has an SOC lower than the SOC of battery 21 in battery station 20 having the minimum SOC among a plurality of batteries 21 for responding to the request for power feeding, control is performed to raise the replacement cost to be higher than the normal replacement cost. In the following, battery 21 having the minimum SOC among a plurality of batteries 21 refers to a second battery having the minimum SOC among a plurality of batteries 21 for responding to the above-mentioned request (for power feeding).

Similarly to the above case of the request for charging, the minimum SOC may refer to a minimum value among respective SOCs of a plurality of batteries 21 before being charged in preparation for battery replacement.

For the power feeding DR, when battery 11 has an SOC lower than the SOC of battery 21 having the minimum SOC among a plurality of batteries 21 of battery station 20, processor 101 performs control to raise the replacement cost of which the user is notified, as the position of electrically powered vehicle 10 is farther from battery station 20. Processor 101 performs the above-described control based on, for example, the position of electrically powered vehicle 10 at the time when an inquiry about the cost for battery replacement is received from the user of electrically powered vehicle 10.

For the power feeding DR, when battery 11 has an SOC lower than the SOC of battery 21 having the minimum SOC among a plurality of batteries 21 of battery station 20, processor 101 performs control to lower the replacement cost of which the user is notified, as the SOC of electrically powered vehicle 10 is lower. Processor 101 performs the above-described control based on, for example, the SOC at the time when an inquiry about the cost for battery replacement is received from the user of electrically powered vehicle 10.

Figure 3:
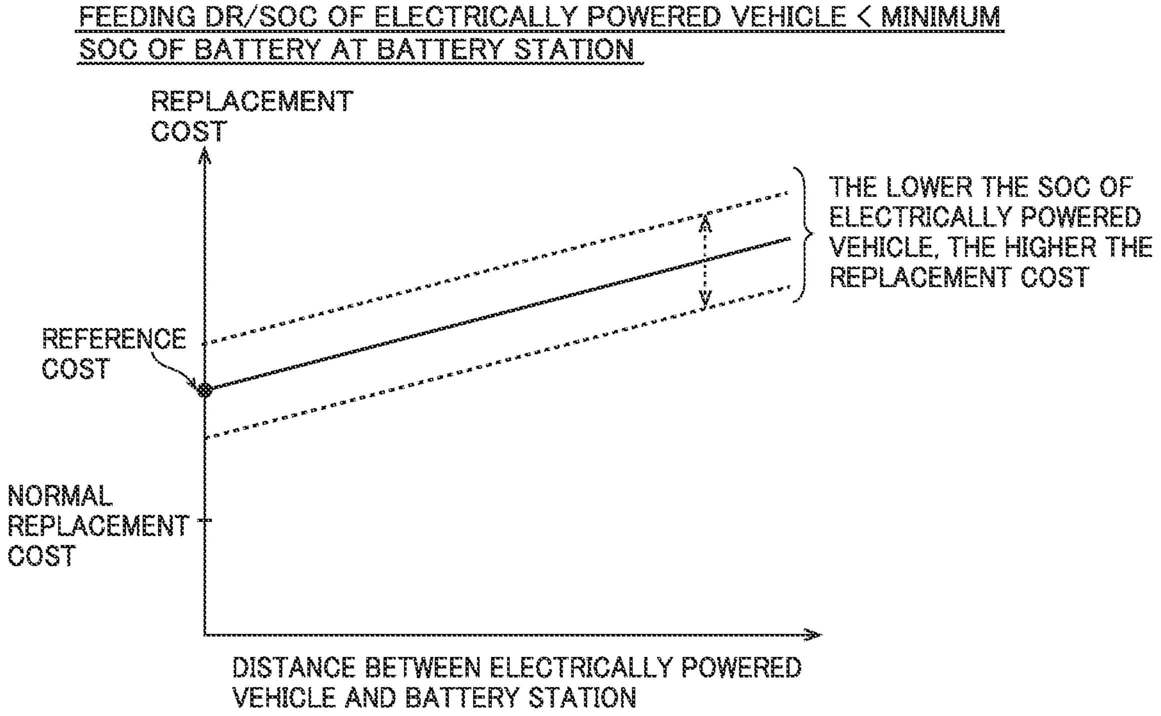
FIG. 3 shows a change of a battery replacement cost for a DR requiring external power feeding.

Specifically, as shown in FIG. 3, the cost for battery replacement increases in proportion to the increase in distance between electrically powered vehicle 10 and battery station 20. The cost for battery replacement also increases in proportion to the decrease in SOC of electrically powered vehicle 10.

Sequence Diagram of Management System

Figure 4:
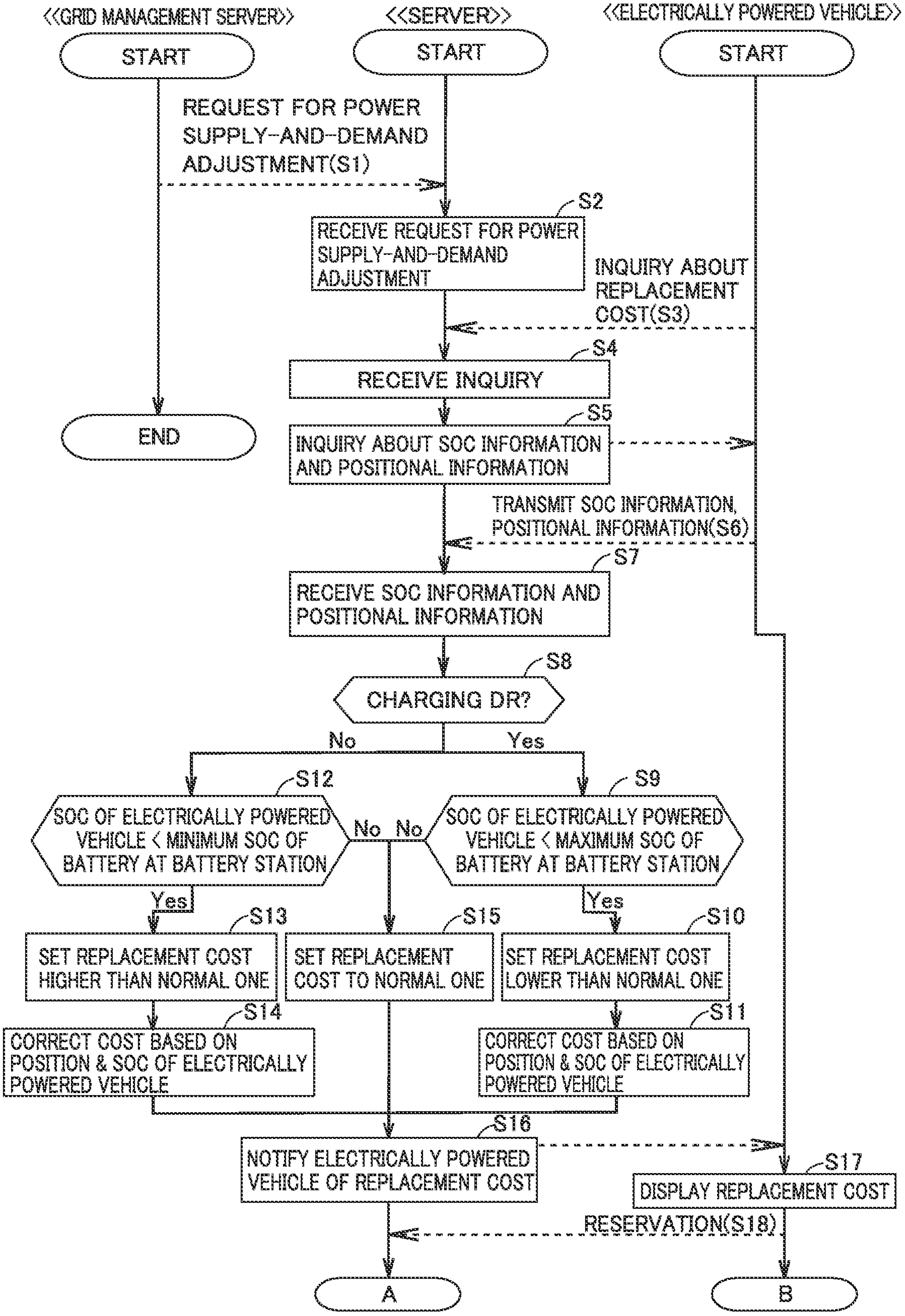
FIG. 4 is a first diagram showing sequence control for the management system according to one embodiment.
Figure 5:
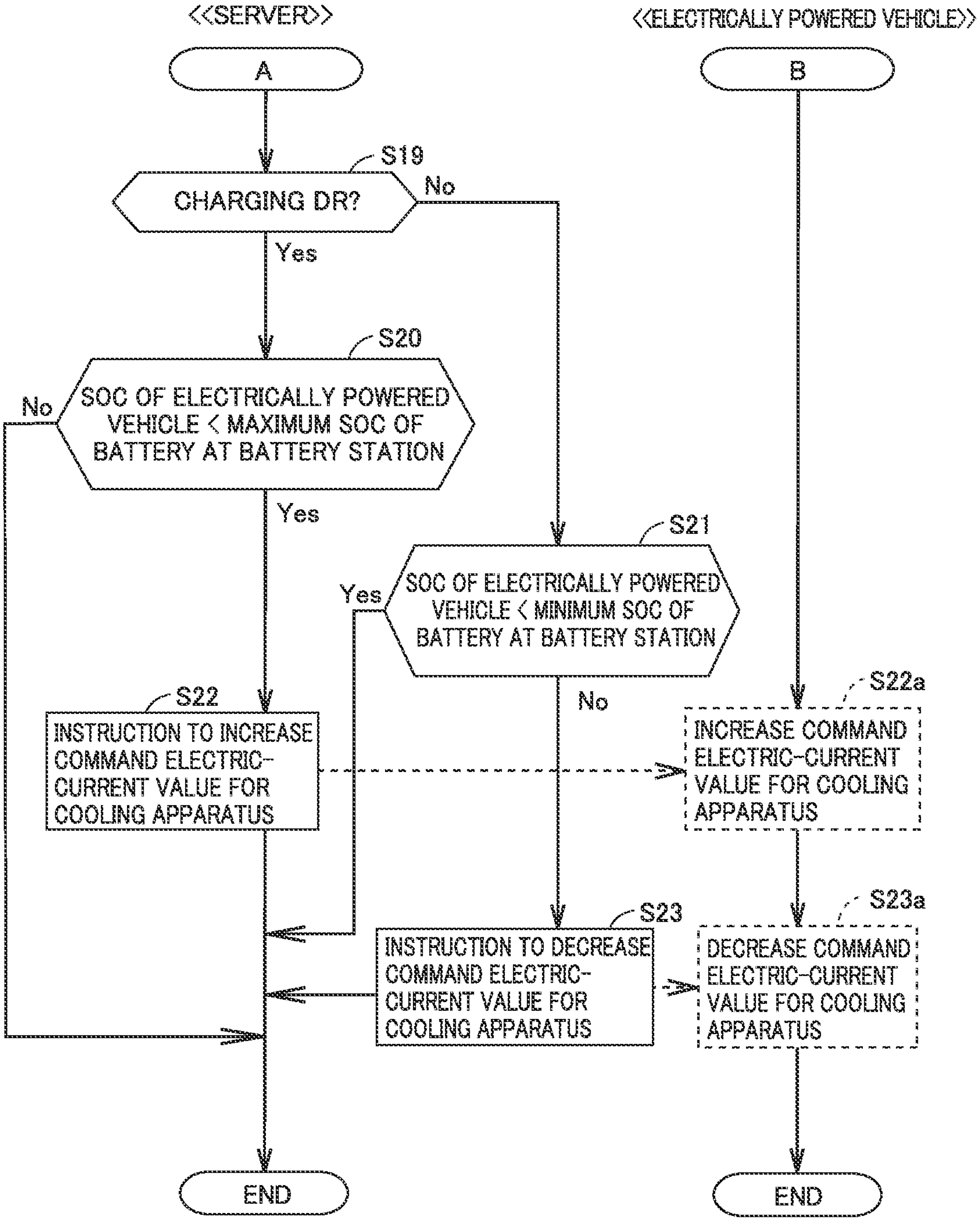
FIG. 5 is a second diagram showing sequence control for the management system according to one embodiment.

Next, with reference to the sequence diagrams of FIGS. 4 and 5, a sequence of management system 1 is described.

As shown in FIG. 4, in step S1, grid management server 200 transmits a request for adjustment of power supply-and-demand in power grid PG, to communication unit 103 of server 100.

In step S2, communication unit 103 of server 100 receives the request for adjustment of power supply-and-demand transmitted from grid management server 200 in step S1.

In step S3, it is supposed that a user of electrically powered vehicle 10 makes an inquiry for server 100 about the cost for battery replacement. In step S4, server 100 receives the above inquiry of step S3. The process in step S5 and subsequent steps described later herein may be performed, based on reservation for use of battery station 20, instead of the above inquiry.

In step S5, server 100 (processor 101) performs control to make an inquiry, for the user of electrically powered vehicle 10, through communication unit 103, about information of the SOC of electrically powered vehicle 10 and the positional information of electrically powered vehicle 10.

In step S6, the user of electrically powered vehicle 10 transmits the SOC information of electrically powered vehicle 10 and the positional information of electrically powered vehicle 10 to server 100 (communication unit 103), using a communication device of electrically powered vehicle 10, or mobile terminal. The SOC information of electrically powered vehicle 10 and the positional information of electrically powered vehicle 10 may be transmitted to server 100 without performing the process in step S5.

In step S7, server 100 (communication unit 103) receives the SOC information of electrically powered vehicle 10 and the positional information of electrically powered vehicle 10 that are transmitted in step S6.

In step S8, server 100 (processor 101) determines whether or not the request for adjustment of power supply-and-demand received in step S2 is a request corresponding to the charging DR. In other words, server 100 (processor 101) determines whether or not the request for adjustment of power supply-and-demand is a request for charging battery 21 with electric power of power grid PG. When the request corresponds to the charging DR (Yes in S8), the process proceeds to step S9. When the request is not a request corresponding to the charging DR (No in S8), the process proceeds to step S12. The case where the request does not correspond to the charging DR refers to the case where the request corresponds to the power feeding DR.

In step S9, processor 101 determines whether or not the SOC of electrically powered vehicle 10 is smaller than the SOC of battery 21 having the maximum SOC in battery station 20. When the SOC of electrically powered vehicle 10 is smaller than the maximum SOC (Yes in S9), the process proceeds to step S10. When the SOC of electrically powered vehicle 10 is larger than or equal to the maximum SOC (No in S9), the process proceeds to step S15.

In step S10, processor 101 sets the replacement cost required for battery replacement to be lower than the normal replacement cost required for battery replacement. For example, processor 101 defines a reference cost (see the black dots in FIG. 2) lower than the normal replacement cost. The reference cost is a replacement cost when the distance between electrically powered vehicle 10 and battery station 20 is zero and the SOC of electrically powered vehicle 10 is lower than the maximum SOC by a predetermined value (for example, 20%).

In step S11, processor 101 corrects the cost required for battery replacement, based on the SOC information of electrically powered vehicle 10 and the positional information of electrically powered vehicle 10 received in step S7. Specifically, the reference cost in step S10 is corrected (see the solid line or broken line in FIG. 2) using the SOC information of electrically powered vehicle 10 and the positional information of electrically powered vehicle 10. At this time, the reference cost may be corrected by a predetermined correction coefficient or the like that is defined in advance. Next, the process proceeds to step S16. The process in step S10 may be skipped and the replacement cost after the correction in step S11 may be calculated directly.

In step S12, it is determined whether or not the SOC of electrically powered vehicle 10 is smaller than the SOC of battery 21 having the minimum SOC in battery station 20. When the SOC of electrically powered vehicle 10 is smaller than the minimum SOC (Yes in S12), the process proceeds to step S13. When the SOC of electrically powered vehicle 10 is larger than or equal to the minimum SOC (No in S12), the process proceeds to step S15.

In step S13, processor 101 sets the replacement cost required for battery replacement to be higher than the normal replacement cost. For example, processor 101 defines a reference cost (see the black dots in FIG. 3) higher than the normal replacement cost. The reference cost is a replacement cost when the distance between electrically powered vehicle 10 and battery station 20 is zero and the SOC of electrically powered vehicle 10 is lower than the minimum SOC by a predetermined value (for example, 10%).

In step S14, processor 101 corrects the cost for battery replacement based on the SOC information of electrically powered vehicle 10 and the positional information of electrically powered vehicle 10 received in step S7. Specifically, the reference cost is corrected (see the solid line or broken line in FIG. 3) by using the SOC information of electrically powered vehicle 10 and the positional information of electrically powered vehicle 10. At this time, the reference cost may be corrected by a predetermined correction coefficient or the like that is defined in advance. Next, the process proceeds to step S16. The process in step S13 may be skipped, and the replacement cost after the correction in step S14 may be calculated directly.

In step S15, processor 101 sets the replacement cost required for battery replacement to the normal replacement cost. Next, the process proceeds to step S16.

In the case of No in step S9, the battery replacement cost may be set higher than the normal replacement cost. In the case of No in step S12, the battery replacement cost may be set lower than the normal replacement cost.

In step S16, server 100 (communication unit 103) transmits the information about the replacement cost that is set (corrected) in step S11, S14, or S15, to the user of electrically powered vehicle 10.

In step S17, the information about the replacement cost transmitted from server 100 in step S16 is displayed on a car navigation system (not shown) of electrically powered vehicle 10, a mobile terminal (not shown) of the user, or the like.

In step S18, it is supposed that server 100 receives a reservation for use of battery station 20 by the user of electrically powered vehicle 10. The process of server 100 and the process of electrically powered vehicle 10 proceed to A and B in FIG. 5, respectively.

In step S19, server 100 (processor 101) determines whether or not the request for adjustment of power supply-and-demand that is received in step S2 is a request corresponding to the charging DR. When the request is a request corresponding to the charging DR (Yes in S19), the process proceeds to step S20. When the request is not a request corresponding to the charging DR (No in S19), the process proceeds to step S21.

In step S20, processor 101 determines whether or not the SOC of electrically powered vehicle 10 is smaller than the SOC of battery 21 having the maximum SOC in battery station 20. When the SOC of electrically powered vehicle 10 is smaller than the maximum SOC (Yes in S20), the process proceeds to step S22. When the SOC of electrically powered vehicle 10 is larger than or equal to the maximum SOC (No in S20), the process is ended.

In step S21, it is determined whether or not the SOC of electrically powered vehicle 10 is smaller than the SOC of battery 21 having the minimum SOC in battery station 20. When the SOC of electrically powered vehicle 10 is smaller than the minimum SOC (Yes in S21), the process is ended. When the SOC of electrically powered vehicle 10 is larger than or equal to the minimum SOC (No in S21), the process proceeds to step S23.

In step S22, server 100 (processor 101) transmits, to electrically powered vehicle 10 through communication unit 103, a command signal for increasing a value of electric current flowing in cooling apparatus 13 (see FIG. 1) so as to cool motor 12 (see FIG. 1) of electrically powered vehicle 10.

In step S22*a*, an ECU (not shown) of electrically powered vehicle 10 increases the command electric current value for cooling apparatus 13, based on the command signal transmitted from server 100 in step S22.

In step S23, server 100 (processor 101) transmits, through communication unit 103 to electrically powered vehicle 10, a command signal for reducing the value of electric current flowing in cooling apparatus 13 (see FIG. 1) for cooling motor 12 (see FIG. 1) of electrically powered vehicle 10. Cooling apparatus 13 is an example of "electrical device" of the present disclosure.

In step S23*a*, the ECU (not shown) of electrically powered vehicle 10 reduces the command electric current value for cooling apparatus 13, based on the command signal transmitted from server 100 in step S23.

As seen from the above, in the present embodiment, processor 101 performs control to notify the user of the replacement cost lower than the normal replacement cost, when charging with electric power of power grid PG is requested and the SOC of battery 11 is lower than the SOC of battery 21 having the maximum SOC to be used for the charging, among a plurality of batteries 21. The replacement cost can be adjusted in this way to urge the user of electrically powered vehicle 10 having an SOC lower than the maximum SOC, to use battery station 20. As a result, the chargeable capacity of batteries in battery station 20 can be increased easily. This makes it possible to easily meet the request for adjustment of power supply-and-demand in power grid PG.

In the present embodiment, when power feeding to power grid PG is requested and the SOC of battery 11 is lower than the SOC of battery 21 that has the minimum SOC and that is to be used for the power feeding, among a plurality of batteries 21, processor 101 performs control to notify the user of the replacement cost higher than the normal replacement cost. The replacement cost can be adjusted in the above-described manner to suppress use of battery station 20 by the user of electrically powered vehicle 10 having an SOC lower than the minimum SOC. As a result, it is possible to suppress decrease in the power feeding capacity of the battery in battery station 20. This makes it possible to easily meet the request for adjustment of power supply-and-demand in power grid PG.

While an example is illustrated above in connection with the above-described embodiment where the cost for battery replacement increases or decreases in proportion to the distance between electrically powered vehicle 10 and battery station 20, the preset disclosure is not limited to this. The cost may be increased or decreased by a certain amount, when the distance between electrically powered vehicle 10 and battery station 20 exceeds a predetermined threshold value. Likewise, the cost may be increased or decreased by a certain amount, when the SOC of electrically powered vehicle 10 falls below a predetermined threshold value.

While an example is illustrated above in connection with the above-described embodiment where the cost for battery replacement is adjusted for each of the charging DR and the power feeding DR, the present disclosure is not limited to this. The cost for battery replacement may be adjusted for only one of the charging DR and the power feeding DR.

While an example is illustrated above in connection with the above-described embodiment where the replacement cost is lowered when the SOC of battery 11 is lower than the maximum value among respective SOCs of a plurality of batteries 21, the present disclosure is not limited to this. For example, the replacement cost may be lowered when the SOC of battery 11 is lower than the average value of the maximum SOC among a plurality of batteries 21 and the second maximum SOC among the plurality of batteries 21. In this case, the average value is an example of "predetermined charge threshold value" of the present disclosure.

For example, the replacement cost may also be lowered when the SOC of battery 11 is lower than the second maximum SOC among a plurality of batteries 21. In this case, the second maximum SOC is an example of "predetermined charging threshold value" of the present disclosure.

While an example is illustrated above in connection with the above-described embodiment where the replacement cost is raised when the SOC of battery 11 is lower than the minimum value among respective SOCs of a plurality of batteries 21, the present disclosure is not limited to this. For example, the replacement cost may be raised when the SOC of battery 11 is lower than the average value of the minimum SOC among a plurality of batteries 21 and the second minimum SOC among the plurality of batteries 21. In this case, the average value is an example of "predetermined power feeding threshold value" of the present disclosure.

For example, the replacement cost may also be raised when the SOC of battery 11 is lower than the second minimum SOC among a plurality of batteries 21. In this case, the second minimum SOC is an example of "predetermined charging threshold value" of the present disclosure.

While an example is illustrated above in connection with the above-described embodiment where the SOC of electrically powered vehicle 10 is adjusted by increasing or decreasing the command current value for cooling apparatus 13, the present disclosure is not limited to this. The command current for an electrical device (for example, air conditioner, heater, or the like) other than cooling apparatus 13 may be changed.

While embodiments of the present disclosure have been illustrated, it should be construed that the embodiments disclosed herein are given by way of illustration in all respects, not by way of limitation. It is intended that the scope of the present disclosure is defined by claims, and encompasses all modifications equivalent in meaning and scope to the claims.

What is claimed is:

1. A management apparatus that manages a battery replacement apparatus provided with at least one battery replaceable with a battery mounted on an electrically powered vehicle, the battery mounted on the electrically powered vehicle being a first battery, the at least one battery provided in the battery replacement apparatus being at least one second battery, the management apparatus comprising:

a first acquisition unit that acquires a request regarding adjustment of electric power supply-and-demand in a power grid; and a controller that performs, based on the request, control to notify, a user of the electrically powered vehicle, of a replacement cost required for battery replacement at the battery replacement apparatus, wherein the at least one second battery includes a maximum SOC battery having an SOC that is maximum among the at least one second battery that can meet a request for charging with electric power of the power grid, and when the charging is requested and the first battery has an SOC lower than a predetermined charging threshold value that is based on the SOC of the maximum SOC battery, the controller performs control to notify the user of the replacement cost lower than a normal replacement cost.

2. The management apparatus according to claim 1, further comprising a second acquisition unit that acquires information about a distance between the electrically powered vehicle and the battery replacement apparatus, wherein when the charging is requested and the first battery has an SOC lower than the predetermined charging threshold value, the controller performs control to lower the replacement cost of which the user is notified, as a position of the electrically powered vehicle is farther from the battery replacement apparatus.

3. The management apparatus according to claim 1, wherein when the charging is requested and the first battery has an SOC lower than the predetermined charging threshold value, the controller performs control to lower the replacement cost of which the user is notified, as the SOC of the first battery is lower.

4. A management apparatus that manages a battery replacement apparatus provided with at least one battery replaceable with a battery mounted on an electrically powered vehicle, the battery mounted on the electrically powered vehicle being a first battery, the at least one battery provided in the battery replacement apparatus being at least one second battery, the management apparatus comprising:

a first acquisition unit that acquires a request regarding adjustment of electric power supply-and-demand in a power grid; and a controller that performs, based on the request, control to notify, a user of the electrically powered vehicle, of a replacement cost required for battery replacement, wherein the at least one second battery includes a minimum SOC battery having an SOC that is minimum among the at least one second battery that can meet a request for power feeding to the power grid, and when the power feeding is requested and the first battery has an SOC lower than a predetermined power feeding threshold value that is based on the SOC of the minimum SOC battery, the controller performs control to notify the user of the replacement cost higher than a normal replacement cost.

5. The management apparatus according to claim 4, further comprising a second acquisition unit that acquires information about a distance between the electrically powered vehicle and the battery replacement apparatus, wherein when the power feeding is requested and the first battery has an SOC lower than the predetermined power feeding threshold value, the controller performs control to raise the replacement cost of which the user is notified, as a position of the electrically powered vehicle is farther from the battery replacement apparatus.

6. The management apparatus according to claim 4, wherein when the power feeding is requested and the first battery has an SOC lower than the predetermined power feeding threshold value, the controller performs control to raise the replacement cost of which the user is notified, as the SOC of the first battery is lower.

7. The management apparatus according to claim 4, wherein the electrically powered vehicle includes at least one electrical device, and when the power feeding is requested and the first battery has an SOC higher than or equal to the predetermined power feeding threshold value, the controller performs control to transmit, to the electrically powered vehicle, a command signal to decrease a value of electric current flowing in the at least one electrical device.

8. A management system comprising:

an electrically powered vehicle on which a first battery is mounted; and a management apparatus that manages a battery replacement apparatus provided with at least one second battery replaceable with the first battery, wherein the management apparatus includes:

an acquisition unit that acquires a request for adjustment of electric power supply-and-demand in a power grid; and a controller that performs, based on the request for adjustment, control to notify, a user of the electrically powered vehicle, of a replacement cost required for battery replacement, the at least one second battery includes a maximum SOC battery having an SOC that is maximum among the at least one second battery that can meet a request for charging with electric power of the power grid, and when the charging is requested and the first battery has an SOC lower than a predetermined charging threshold value that is based on the SOC of the maximum SOC battery, the controller performs control to notify the user of the replacement cost lower than a normal replacement cost.

9. The management system according to claim 8, wherein the electrically powered vehicle includes at least one electrical device, when the charging is requested and the first battery has an SOC lower than the predetermined charging threshold value, the controller performs control to transmit, to the electrically powered vehicle, a command signal to increase a value of electric current flowing in the at least one electrical device, and the electrically powered vehicle increases, based on the command signal, the value of electric current flowing in the at least one electrical device.

* * * * *